United States Patent
Mathiesen et al.

(10) Patent No.: US 8,485,258 B2
(45) Date of Patent: Jul. 16, 2013

(54) USE OF AUTONOMOUS (SELF-ADJUSTING) VALVES IN INJECTORS IN OIL PRODUCTION

(75) Inventors: Vidar Mathiesen, Porsgrunn (NO); Haavard Aakre, Skien (NO)

(73) Assignee: Statoil ASA, Stavanger (NO)

( * ) Notice: Subject to any disclaimer, the term of this patent is extended or adjusted under 35 U.S.C. 154(b) by 362 days.

(21) Appl. No.: 12/811,425

(22) PCT Filed: Dec. 16, 2008

(86) PCT No.: PCT/NO2008/000455
§ 371 (c)(1), (2), (4) Date: Sep. 23, 2010

(87) PCT Pub. No.: WO2009/088293
PCT Pub. Date: Jul. 16, 2009

(65) Prior Publication Data
US 2011/0011590 A1    Jan. 20, 2011

(30) Foreign Application Priority Data

Jan. 4, 2008  (NO) .................................. 20080081

(51) Int. Cl.
*E21B 43/16* (2006.01)
*E21B 43/25* (2006.01)

(52) U.S. Cl.
USPC ... 166/305.1; 166/311; 166/312; 137/533.17; 137/533.19

(58) Field of Classification Search
USPC .................. 166/305.1, 311, 312; 137/533.17, 137/533.19
See application file for complete search history.

(56) References Cited

U.S. PATENT DOCUMENTS

| | | | | |
|---|---|---|---|---|
| 3,319,717 | A * | 5/1967 | Chenoweth | 166/115 |
| 3,381,708 | A * | 5/1968 | Chenoweth | 137/504 |
| 3,381,749 | A * | 5/1968 | Chenoweth | 166/55 |
| 4,577,691 | A | 3/1986 | Huang et al. | |
| 4,791,956 | A | 12/1988 | Kominami et al. | |
| 4,821,801 | A | 4/1989 | Van Laar | |
| 4,858,644 | A * | 8/1989 | Decker | 137/504 |
| 4,858,691 | A | 8/1989 | Ilfrey et al. | |
| 4,986,352 | A | 1/1991 | Alameddine | |
| 5,435,393 | A | 7/1995 | Brekke et al. | |
| 7,600,533 | B2 * | 10/2009 | Tai et al. | 137/516.25 |
| 8,261,822 | B2 * | 9/2012 | Jordy | 166/269 |

FOREIGN PATENT DOCUMENTS

| | | |
|---|---|---|
| GB | 2169018 A | 7/1986 |
| GB | 2376488 A | 12/2002 |
| GB | 2 421 746 A | 7/2006 |

(Continued)

OTHER PUBLICATIONS

White et al., "Controlling Flow in Horizontal Wells," World Oil, Nov. 1991, pp. 73-80 plus 1 page attachment.

*Primary Examiner* — Giovanna Wright
(74) *Attorney, Agent, or Firm* — Birch, Stewart, Kolasch & Birch, LLP

(57) ABSTRACT

A method for injecting a fluid into an oil and or gas reservoir or formation, in which the fluid flows into the reservoir or formation through a plurality of autonomous valves or flow control devices (2) provided along an injector (24), the valves (2) having a substantially constant flow-through volume above a given differential pressure for autonomously adjusting the flow of the fluid in order to ensure a substantially constant volume rate from the injector (24) to the reservoir or formation along an injector length.

4 Claims, 6 Drawing Sheets

FOREIGN PATENT DOCUMENTS

| WO | WO 91/03781 | A1 | 3/1991 |
| WO | WO 92/08875 | A2 | 5/1992 |
| WO | WO 92/08875 | A3 | 5/1992 |
| WO | WO 2008/004875 | A1 | 1/2008 |

* cited by examiner

USE OF AUTONOMOUS (SELF-ADJUSTING) VALVES IN INJECTORS IN OIL PRODUCTION

BACKGROUND OF THE INVENTION

1. Field of the Invention

The present invention relates to a method for injecting a fluid into an oil and or gas reservoir or formation

2. Background of the Invention

More particularly, the invention relates to a method using an autonomous valve or flow control device in injectors in oil production, said valve or flow control device being described in patent application No. 20063181 withdrawn before publication and in International application No. PCT/NO2007/000204 claiming priority from NO 20063181 and which is not yet published at the date of filing of the present application.

Devices for recovering of oil and gas from long, horizontal and vertical wells are known from U.S. Pat. Nos. 4,821,801, 4,858,691, 4,577,691 and GB patent publication No. 2169018. These known devices comprise a perforated drainage pipe with, for example, a filter for control of sand around the pipe. A considerable disadvantage with the known devices for oil/and or gas production in highly permeable geological formations is that the pressure in the drainage pipe increases exponentially in the upstream direction as a result of the flow friction in the pipe. Because the differential pressure between the reservoir and the drainage pipe will decrease upstream as a result, the quantity of oil and/or gas flowing from the reservoir into the drainage pipe will decrease correspondingly. The total oil and/or gas produced by this means will therefore be low. With thin oil zones and highly permeable geological formations, there is further a high risk that of coning, i.e. flow of unwanted water or gas into the drainage pipe downstream, where the velocity of the oil flow from the reservoir to the pipe is the greatest.

From World Oil, vol. 212, N. 11 (11/91), pages 73-80, is previously known to divide a drainage pipe into sections with one or more inflow restriction devices such as sliding sleeves or throttling devices. However, this reference is mainly dealing with the use of inflow control to limit the inflow rate for up hole zones and thereby avoid or reduce coning of water and or gas.

WO-A-9208875 describes a horizontal production pipe comprising a plurality of production sections connected by mixing chambers having a larger internal diameter than the production sections. The production sections comprise an external slotted liner which can be considered as performing a filtering action. However, the sequence of sections of different diameter creates flow turbulence and prevent the running of work-over tools.

When extracting oil and or gas from geological production formations, fluids of different qualities, i.e. oil, gas, water (and sand) is produced in different amounts and mixtures depending on the property or quality of the formation. None of the above-mentioned, known devices are able to distinguish between and control the inflow of oil, gas or water on the basis of their relative composition and/or quality.

With the autonomous valve as described in NO 20063181 and PCT/NO2007/000204 is provided an inflow control device which is self adjusting or autonomous and can easily be fitted in the wall of a production pipe and which therefore provide for the use of work-over tools. The device is designed to "distinguish" between the oil and/or gas and/or water and is able to control the flow or inflow of oil or gas, depending on which of these fluids such flow control is required.

The device as disclosed in NO 20063181 and PCT/NO2007/000204 is robust, can withstand large forces and high temperatures, prevents draw dawns (differential pressure), needs no energy supply, can withstand sand production, is reliable, but is still simple and very cheap.

As to prior art technology, injector wells in oil reservoirs are used to increase oil recovery (IOR) and/or enhanced oil recovery (EOR). Injectors can be used to inject e.g. water, steam, hydrocarbon gas and/or $CO_2$. The injector wells may have different orientation and extent. In many situations the injected fluid should be evenly distributed in the reservoir. In these cases long injection wells are used, and the injected fluids are injected in different sections along the well.

When injecting fluid in different sections along a well the injection will be non-uniform (see FIG. 10). This is mainly caused by the non-uniform reservoir which may include e.g. high and low permeable zones, fractures and short-cuts. The nature of all fluid flow is that the fluid will flow where the resistance is smallest. This fact ensures that the injections will, most often, be very non-uniform. This result in poor utilization of injected fluid and low IOR/EOR effect.

SUMMARY OF THE INVENTION

The method according to the present invention is characterized in that the fluid flows into the reservoir or formation through a plurality of autonomous valves or flow control devices provided along an injector, the valves having a substantially constant flow-through volume above a given differential pressure for autonomously adjusting the flow of the fluid in order to ensure a substantially constant volume rate from the injector to the reservoir or formation along an injector length.

BRIEF DESCRIPTION OF THE DRAWINGS

The present invention will be further described in the following by means of examples and with reference to the drawings, where.

DETAILED DESCRIPTION OF THE PREFERRED EMBODIMENTS

Figure 1:
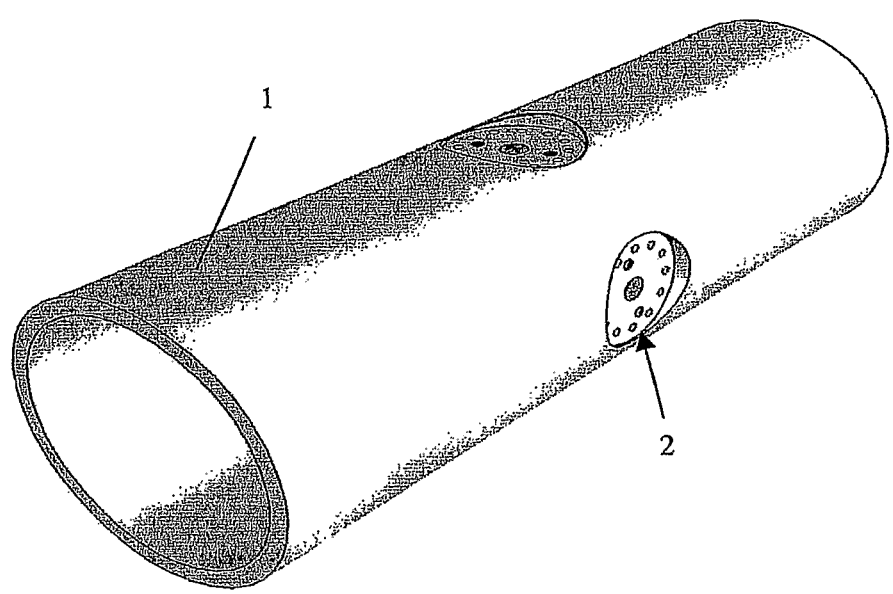
FIG. 1 shows a schematic view of a production pipe with a control device according to PCT/NO2007/000204 or the present invention, FIG. 2 a) shows, in larger scale, a cross section of the control device according to PCT/NO2007/000204, b) shows the same device in a top view.

FIG. 1 shows, as stated above, a section of a production pipe 1 in which a prototype of a control device 2, according to PCT/NO2007/000204 is provided. The control device 2 is preferably of circular, relatively flat shape and may be provided with external threads 3 (see FIG. 2) to be screwed into a circular hole with corresponding internal threads in the pipe or an injector. By controlling the thickness, the device 2, may be adapted to the thickness of the pipe or injector and fit within its outer and inner periphery.

Figure 2:
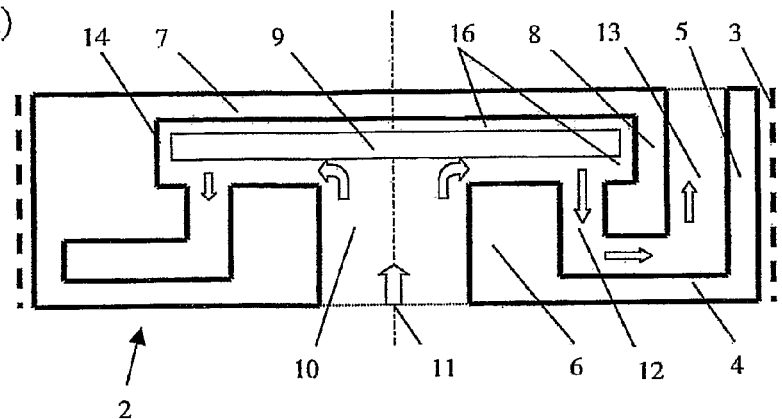
Figure 2:
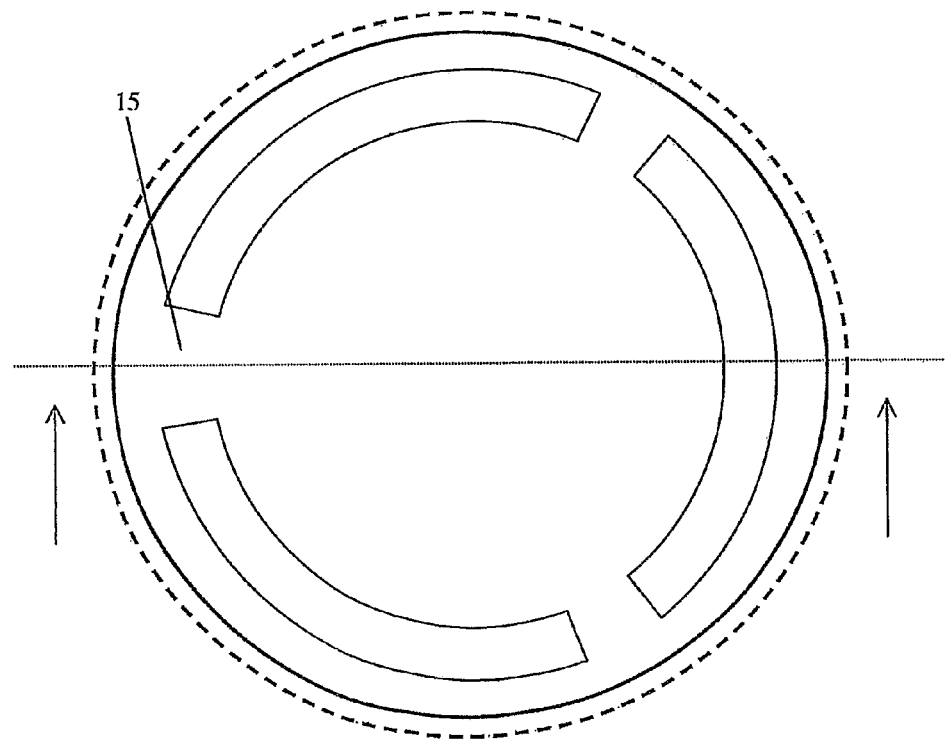

FIG. 2 a) and b) shows the prior control device 2 of PCT/NO2007/000204 in larger scale. The device consists of a first disc-shaped housing body 4 with an outer cylindrical segment 5 and inner cylindrical segment 6 and with a central hole or aperture 10, and a second disc-shaped holder body 7 with an outer cylindrical segment 8, as well as a preferably flat disc or freely movable body 9 provided in an open space 14 formed between the first 4 and second 7 disc-shaped housing and holder bodies. The body 9 may for particular applications and adjustments depart from the flat shape and have a partly conical or semicircular shape (for instance towards the aperture 10.) As can be seen from the figure, the cylindrical segment 8 of the second disc-shaped holder body 7 fits within and protrudes in the opposite direction of the outer cylindrical segment 5 of the first disc-shaped housing body 4 thereby forming a flow path as shown by the arrows 11, where the fluid enters the control device through the central hole or aperture (inlet) 10 and flows towards and radially along the disc 9 before flowing through the annular opening 12 formed between the cylindrical segments 8 and 6 and further out through the annular opening 13 formed between the cylindrical segments 8 and 5. The two disc-shaped housing and holder bodies 4, 7 are attached to one another by a screw connection, welding or other means (not further shown in the figures) at a connection area 15 as shown in FIG. 2b).

The present invention exploits the effect of Bernoulli teaching that the sum of static pressure, dynamic pressure and friction is constant along a flow line:

$$p_{static} + \tfrac{1}{2}\rho v^2 + \Delta p_{friction}$$

When subjecting the disc 9 to a fluid flow, which is the case with the present invention, the pressure difference over the disc 9 can be expressed as follows:

$$\Delta p_{over} = [p_{over(P_4)} - p_{under(f(p_1,p_2,p_3))}] = \tfrac{1}{2}\rho v^2$$

Due to lower viscosity, a fluid such as gas will "make the turn later" and follow further along the disc towards its outer end (indicated by reference number 14). This makes a higher stagnation pressure in the area 16 at the end of the disc 9, which in turn makes a is higher pressure over the disc. And the disc 9, which is freely movable within the space between the disc-shaped bodies 4, 7, will move downwards and thereby narrow the flow path between the disc 9 and inner cylindrical segment 6. Thus, the disc 9 moves dawn-wards or up-wards depending on the viscosity of the fluid flowing through, whereby this principle can be used to control (close/open) the flow of fluid through of the device.

Figure 3:
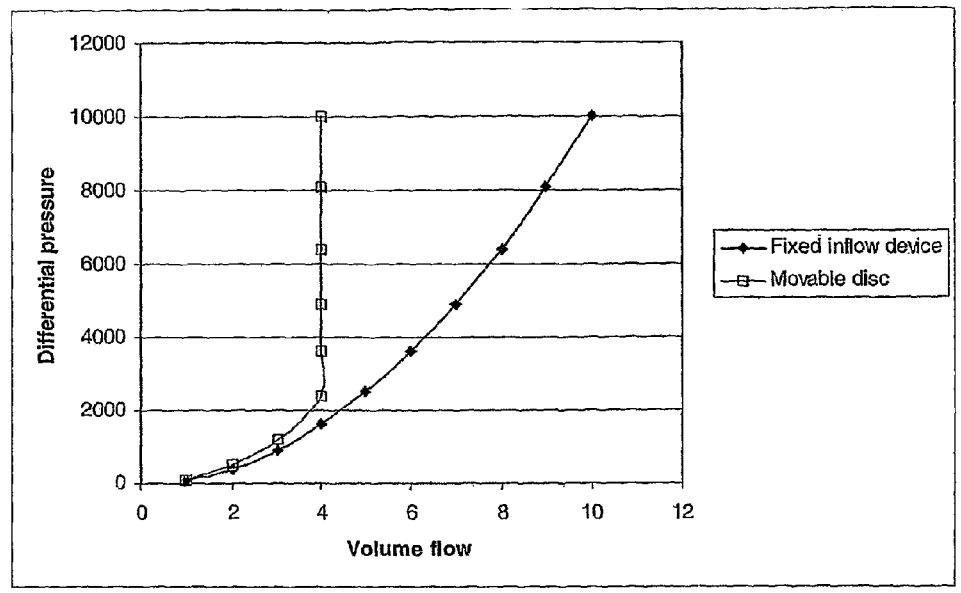
FIG. 3 is a diagram showing the flow volume through a control device according to the invention vs. the differential pressure in comparison with a fixed inflow device.

Further, the pressure drop through a traditional inflow control device (ICD) with fixed geometry will be proportional to the dynamic pressure:

$$\Delta p = K \cdot \tfrac{1}{2}\rho v^2$$

where the constant, K is mainly a function of the geometry and less dependent on the Reynolds number. In the control device according to the present invention the flow area will decrease when the differential pressure increases, such that the volume flow through the control device will not, or nearly not, increase when the pressure drop increases. A comparison between a control device according to the present invention with movable disc and a control device with fixed flow-through opening is shown in FIG. 3, and as can be seen from the figure, the flow-through volume for the present invention is constant above a given differential pressure.

This represents a major advantage with the present invention as it can be used to ensure the same volume flowing through each section for the entire horizontal well, which is not possible with fixed inflow control devices.

Figure 4:
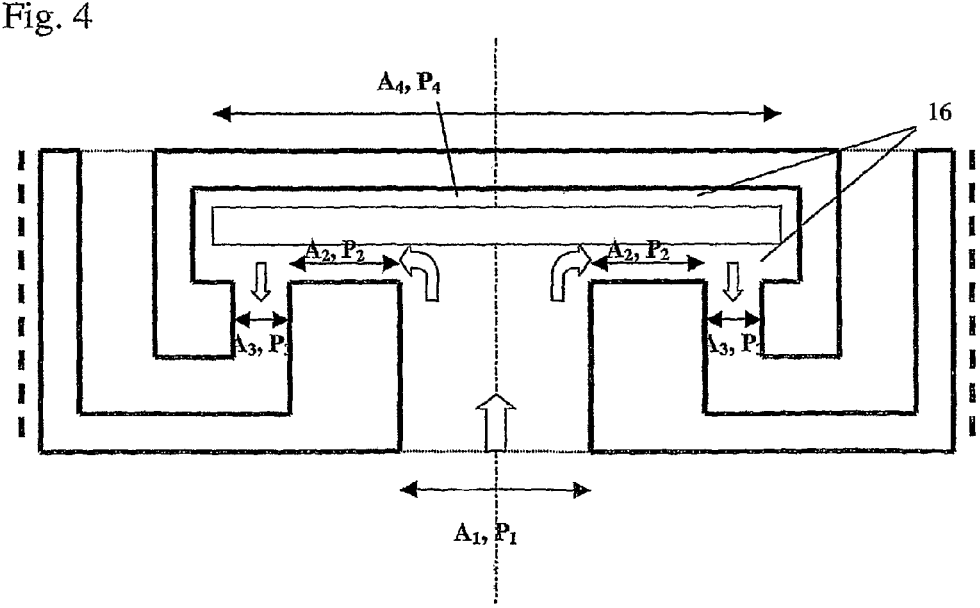
FIG. 4 shows the device shown in FIG. 2, but with the indication of different pressure zones influencing the design of the device for different applications.

When producing oil and gas the control device according to the invention may have two different applications: Using it as inflow control device to reduce inflow of water, or using it to reduce inflow of gas at gas break through situations. When designing the control device according to the invention for the different application such as water or gas, as mentioned above, the different areas and pressure zones, as shown in FIG. 4, will have impact on the efficiency and flow through properties of the device. Referring to FIG. 4, the different area/pressure zones may be divided into:

$A_1$, $P_1$ is the inflow area and pressure respectively. The force ($P_1 \cdot A_1$) generated by this pressure will strive to open the control device (move the disc or body 9 upwards).

$A_2$, $P_2$ is the area and pressure in the zone where the velocity will be largest and hence represents a dynamic pressure source. The resulting force of the dynamic pressure will strive to close the control device (move the disc or body 9 downwards as the flow velocity increases).

$A_3$, $P_3$ is the area and pressure at the outlet. This should be the same as the well pressure (inlet pressure).

$A_4$, $P_4$ is the area and pressure (stagnation pressure) behind the movable disc or body 9. The stagnation pressure, at position 16 (FIG. 2), creates the pressure and the force behind the body. This will strive to close the control device (move the body downwards).

Fluids with different viscosities will provide different forces in each zone depending on the design of these zones. In order to optimize the efficiency and flow through properties of the control device, the design of the areas will be different for different applications, e.g. gas/oil or oil/water flow. Hence, for each application the areas needs to be carefully balanced and optimally designed taking into account the properties and physical conditions (viscosity, temperature, pressure etc.) for each design situation.

Figure 5:
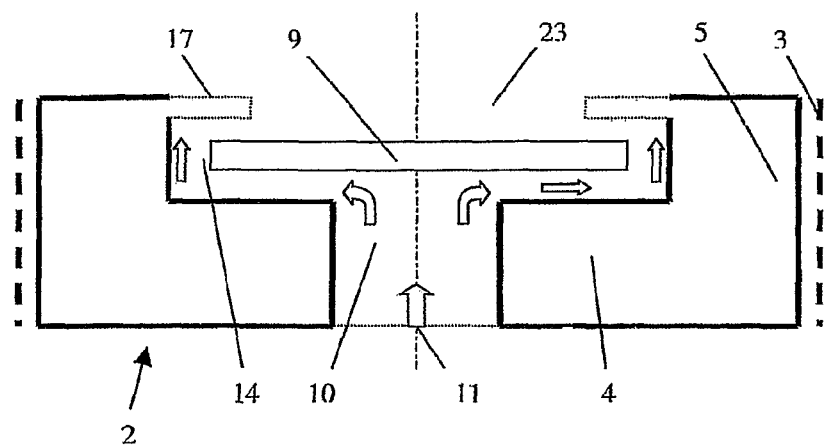
FIG. 5 shows a principal sketch of another embodiment of the control device according to PCT/NO2007/000204.

FIG. 5 shows a principal sketch of another embodiment of the control device according to PCT/NO2007/000204, which is of a more simple design than the version shown in FIG. 2. The control device 2 consists, as with the version shown in FIG. 2, of a first disc-shaped housing body 4 with an outer cylindrical segment 5 and with a central hole or aperture 10, and a second disc-shaped holder body 17 attached to the segment 5 of the housing body 4, as well as a preferably flat disc 9 provided in an open space 14 formed between the first and second disc-shaped housing and holder bodies 4, 17. However, since the second disc-shaped holder body 17 is inwardly open (through a hole or holes 23, etc.) and is now only holding the disc in place, and since the cylindrical segment 5 is shorter with a different flow path than what is shown in FIG. 2, there is no build up of stagnation pressure ($P_4$) on the back side of the disc 9 as explained above in conjunction with FIG. 4. With this solution without stagnation pressure the building thickness for the device is lower and may withstand a larger amount of particles contained in the fluid.

Figure 6:
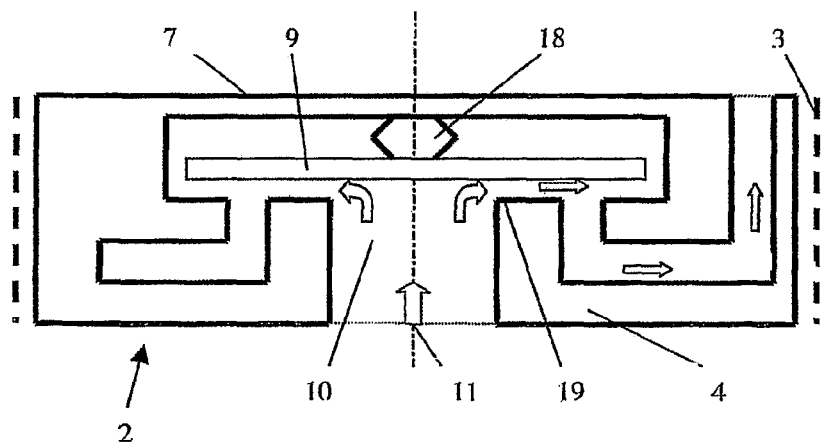
FIG. 6 shows a principal sketch of a third embodiment of the control device according to PCT/NO2007/000204.

FIG. 6 shows a third embodiment according to PCT/NO2007/000204 where the design is the same as with the example shown in FIG. 2, but where a spring element 18, in the form of a spiral or other suitable spring device, is provided on either side of the disc and connects the disc with the holder 7, 22, recess 21 or housing 4.

The spring element 18 is used to balance and control the inflow area between the disc 9 and the inlet 10, or rather the surrounding edge or seat 19 of the inlet 10. Thus, depending on the spring constant and thereby the spring force, the opening between the disc 9 and edge 19 will be larger or smaller, and with a suitable selected spring constant, depending on the inflow and pressure conditions at the selected place where the control device is provided, constant mass flow through the device may be obtained.

Figure 7:
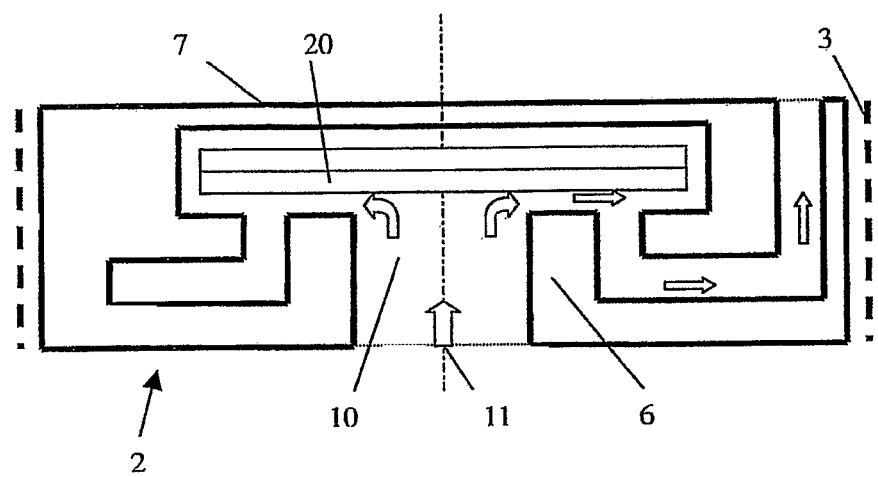
FIG. 7 shows a principal sketch of a fourth embodiment of the control device according to PCT/NO2007/000204.

FIG. 7 shows a fourth embodiment according to PCT/NO2007/000204, where the design is the same as with the example in FIG. 6 above, but where the disc 9 is, on the side facing the inlet opening 10, provided with a thermally responsive device such as bi-metallic element 20.

When producing oil and/or gas the conditions may rapidly change from a situation where only or mostly oil is produced to a situation where only or mostly gas is produced (gas breakthrough or gas coning). With for instance a pressure drop of 16 bar from 100 bar the temperature drop would correspond to approximately 20° C. By providing the disc 9 with a thermally responsive element such as a bi-metallic element as shown in FIG. 7, the disc will bend upwards or be moved upwards by the element 20 abutting the holder shaped body 7 and thereby narrowing the opening between the disc and the inlet 10 or fully closing said inlet.

Figure 8:
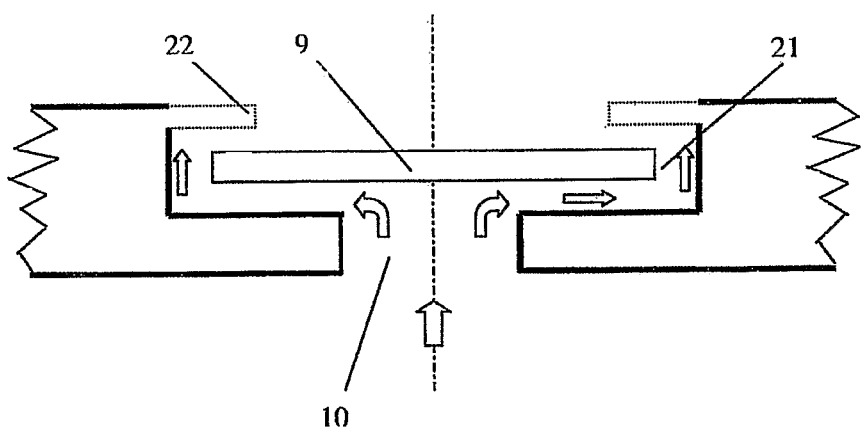
FIG. 8 shows a principal sketch of a fifth embodiment of PCT/NO2007/000204 where the control device is an integral part of a flow arrangement.

The above examples of a control device as shown in FIGS. 1 and 2 and 4-7 are all related to solutions where the control device as such is a separate unit or device to be provided in conjunction with a fluid flow situation or arrangement such as the wall of a production pipe in connection with the production of oil and gas. However, the control device may, as shown in FIG. 8, be an integral part of the fluid flow arrangement, whereby the movable body 9 may be provided in a recess 21 facing the outlet of an aperture or hole 10 of for instance a wall of a pipe 1 as shown in FIG. 1 instead of being provided in a separate housing body 4. Further, the movable body 9 may be held in place in the recess by means of a holder device such as inwardly protruding spikes, a circular ring 22 or the like being connected to the outer opening of the recess by means of screwing, welding or the like.

Figure 9:
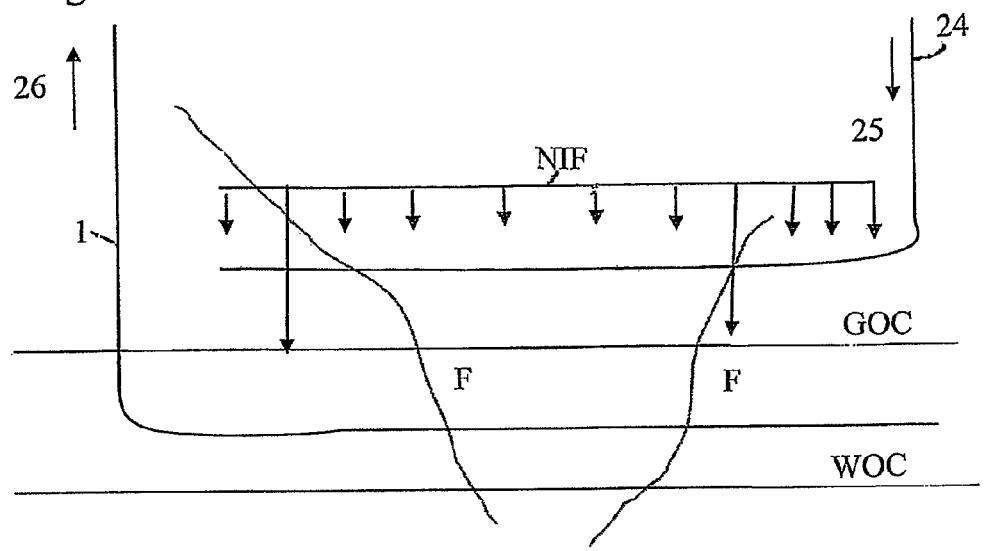
FIG. 9 shows a typical injection profile in a reservoir with fractures and conventional technology.
Figure 10:
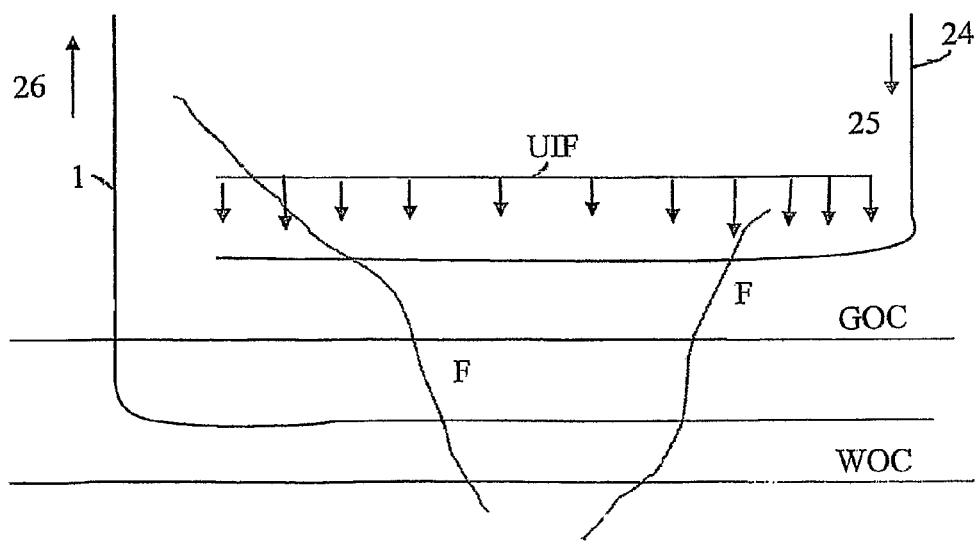
FIG. 10 shows a typical injection profile in a reservoir with fractures and the method according to the present invention.

FIGS. 9 and 10 show typical injection profiles in a reservoir with fractures F, using conventional technology and the method according to the present invention, respectively. In FIG. 10 a plurality of autonomous valves or control devices 2 (not shown in the figure) are provided along the length of an injector 24, leading to a substantially uniform injection of the fluid as shown with the line of arrows (UIF) of almost equal length. Contrary, the conventional injection technology shown in FIG. 9 leads to a non-uniform injection of fluid (NIF), especially in the fractures F in which the injected fluid makes a shortcut, as also mentioned in the introductionary part of the description. In both FIGS. 9 and 10 the production pipe 1 is the same, and the flow directions in the production pipe 1 and in the injector 24 are indicated with arrows 25 and 26, respectively. In both FIGS. 9 and 10, two lines indicating gas-oil contact (GOC) and water-oil contact (WOC) are further shown.

With the present invention, due to the constant volume rate, a much better drainage of the reservoir is thus achieved. This result in significant larger production of that reservoir. At the same time the required amount of injected fluids can be reduced significantly. This is important e.g. in bitumen production where steam is injected.

Further, due to the flow characteristic of the valve, the injection along the different section of the well will be substantially uniform. This is ensured by the unique constant volume rate of the valve 2, even for non-uniform reservoir where the pressure drop in it will vary.

As fluids for injection a.o. water, steam, hydrocarbon gas and/or $CO_2$ might be used, and other fluids are also conceivable within the scope of the present invention as defined by the appended claims.

The invention claimed is:

1. A method for injecting a fluid into an oil and/or gas reservoir or formation, comprising the steps of:
   flowing the fluid into the reservoir or formation through a plurality of autonomous valves provided along an injector, each valve of the plurality of autonomous valves comprising a freely moveable controlling body in a flow path through the valve such that the freely moveable controlling body moves by exploiting forces generated by the Bernoulli effect to provide a substantially constant flow-through volume above a given differential pressure for autonomously adjusting the flow of the fluid in order to ensure a substantially constant volume rate from the injector to the reservoir or formation along an injector length.

2. The method according to claim 1, further comprising the steps of:
   including the freely movable controlling body in a recess of the injector wall or in a separate housing body in the wall, the controlling body facing an outlet of an aperture or hole in the center of the recess or housing body and being held in place in the recess or housing body by a holder device or arrangement, thereby forming a flow path where the fluid enters the valve through the aperture or inlet flowing towards and along the body and out of the recess or housing.

3. The method according to claim 1, wherein the fluid is water, steam, hydrocarbon gas and/or $CO_2$.

4. The method according to claim 2, wherein the fluid is water, steam, hydrocarbon gas and/or $CO_2$.

* * * * *

UNITED STATES PATENT AND TRADEMARK OFFICE
CERTIFICATE OF CORRECTION

PATENT NO. : 8,485,258 B2  Page 1 of 1
APPLICATION NO. : 12/811425
DATED : July 16, 2013
INVENTOR(S) : Mathiesen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 440 days.

Signed and Sealed this
Eighth Day of September, 2015

Michelle K. Lee
*Director of the United States Patent and Trademark Office*